Figure 1:
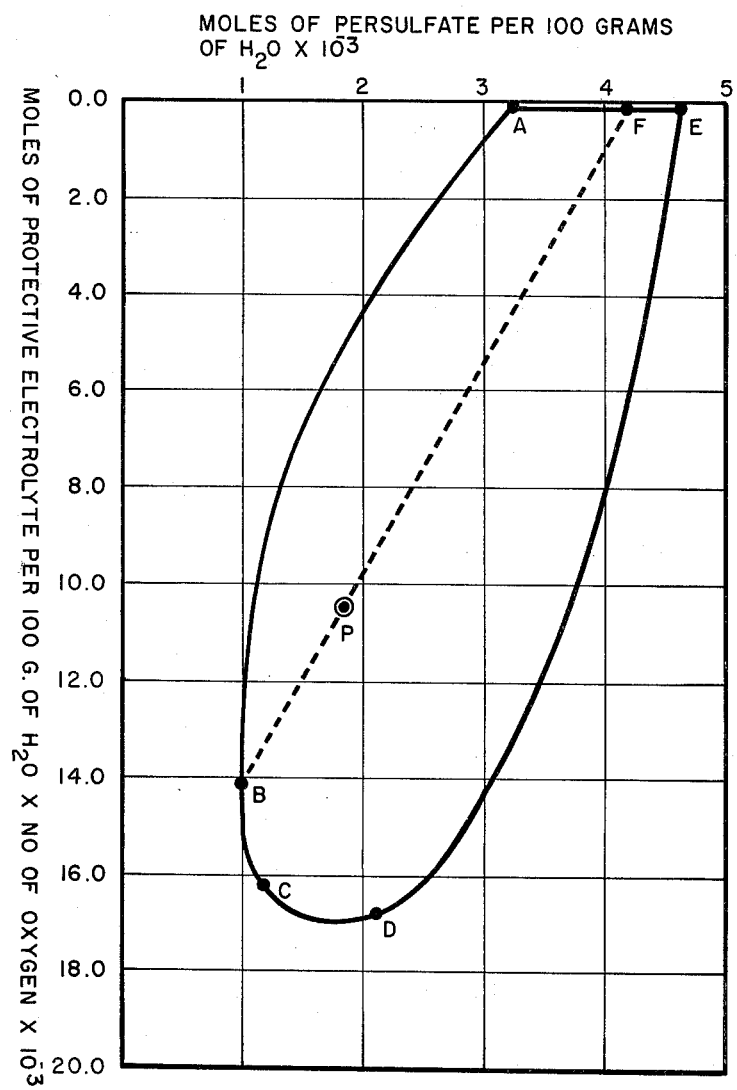

United States Patent Office 2,988,529
Patented June 13, 1961

2,988,529
PROCESS FOR PRODUCING STABLE AQUEOUS EMULSION COMPRISING POLYMER OF UNSATURATED MONOMER AND PROTECTIVE ELECTROLYTE AND PRODUCT THEREOF
Carolyn E. Breed, Needham Heights, Victor S. Frank, Newton Center, and Anthony J. Urjil, Byfield, Mass., assignors to W. R. Grace & Co., Cambridge, Mass., a corporation of Connecticut
Filed Aug. 19, 1957, Ser. No. 679,005
6 Claims. (Cl. 260—29.6)

This invention relates to a process for producing stable latices of high concentration wherein fine particles of a water insoluble polymer are dispersed in water in the absence of any emulsifying agent. This process is particularly useful in connection with the formation of such latices containing polymers of vinyl esters of aliphatic carboxylic acids.

Latices containing polymers of vinyl esters of aliphatic carboxylic acids such as vinyl acetate are useful as film forming and binding agents in paints, adhesives, impregnants, and coatings. It is customary in making compositions for such purposes to compound the latex with various other ingredients such as fillers, pigments, resins, thickening agents and the like. However, the range of compounding techniques and the usefulness of the resulting compositions have heretofore been limited by the fact that it has been necessary in order to obtain stable latices having a high solids content (e.g., 50% total solids or more) to form the latex in the presence of an emulsifying agent. Various surface active agents and hydrophilic protective colloids have been suggested for use as the emulsifying agent.

In view of the fact that many of the effective surface active agents are ionic in nature and cause the latex to be susceptible to coagulation in the presence of such compounding ingredients, it has been customary, in practice, to rely upon various hydrophilic protective colloids as the emulsifying agent for vinyl ester latices. Such protective colloids include polyvinyl alcohol, polyvinyl pyrrolidone, polyacrylamide, hydroxy ethyl cellulose, gum tragacanth, gum arabic and certain water-soluble starch derivatives.

The presence of such protective colloids has usually been a necessary evil. Many of them are attacked by bacteria or will hydrolyze in water and, when changes occur, the latex becomes unstable. More importantly, it is found to be from difficult to impossible to make such a protective colloid insensitive to water. Its presence in a film, coating, or the like formed from a latex containing such a colloid imparts its water susceptible properties to the film itself and causes the film or coating to be susceptible to attack by water. In addition, the presence of the protective colloid, because it "protects" each particle in the liquid latex, insulates to a certain degree that particle in the film and thus interferes with the consolidation of the individual particles into a continuous film and reduces the adhesive bond of the film to the various surfaces on which it may be spread.

As may be expected, in view of the disadvantages caused by the presence of emulsifying agents in a latex, considerable effort has been expended for the purpose of eliminating the need for such an agent. In most instances, the result of polymerizing a substantially water insoluble monomer system in water in the absence of an emulsifying agent, if successful at all, has been the formation of large particles or beads of polymer which either settle out or can be separated from the aqueous phase by normal filtration. In the few instances where it has been reported that stable latex systems have been formed under such conditions the yields appear to be low, the total solids obtained have been below the desired 50% level, or the reaction time has been unduly long.

In addition, it would appear that normally in an emulsifier free system, even though a stable latex is formed, the individual polymer particles in that latex are considerably larger than would be obtained had an emulsifying agent been used in the polymerization. In the case of a vinyl ester it is especially desirable to obtain a small size polymer particle since the smaller the particle size, the higher the pigment binding power of the latex, the higher the gloss and the degree of film consolidation in films formed from the latex, and the greater the ease of impregnating fiber products.

We have discovered a method of producing in high yield stable latices containing polymers and copolymers of certain vinyl esters which possess high solids and small particles without using an emulsifying agent in the polymerization. This result is obtained by the use of certain rather critical reaction conditions and proportions of ingredients. In brief, our process requires the continuous addition of certain lower aliphatic vinyl esters or the combination of such esters with certain other monomers to an aqueous system maintained at a temperature in excess of a certain minimum temperature and containing a certain concentration of a combination of persulfate initiator and protective electrolyte.

Figure 2:
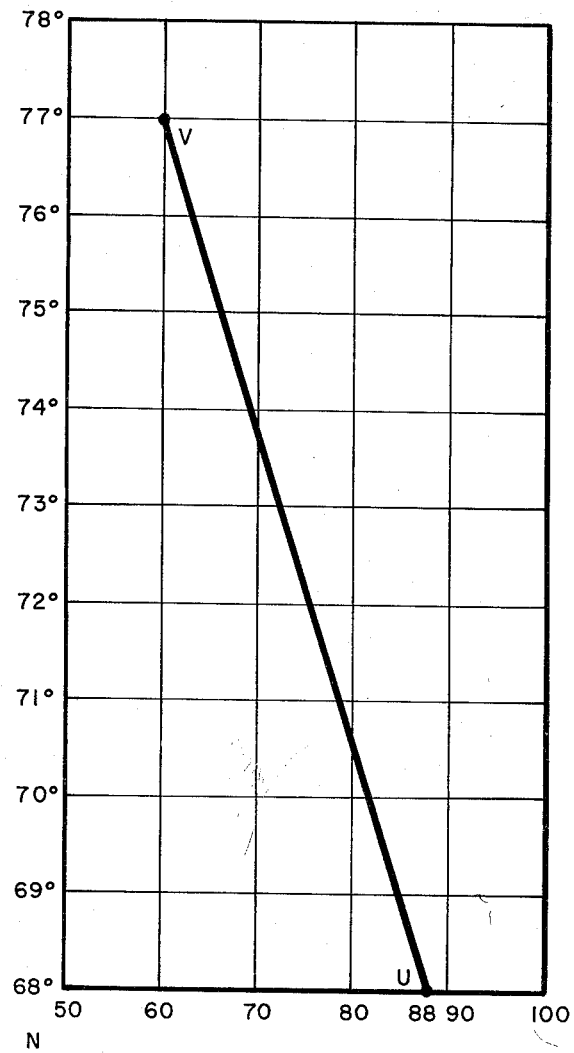

In the drawing:
FIGURE 1 is a graph showing the permissible combinations of persulfate initiator and protective electrolyte.
FIGURE 2 is a graph showing the minimum temperature at which various monomer systems can be polymerized.

I. MONOMER

We have found that our process is applicable to the following monomers: vinyl acetate, vinyl propionate, vinyl butyrate, and vinyl isobutyrate. For convenience, these monomers are referred to as the "lower aliphatic vinyl esters." These monomers may be polymerized separately, in combination with each other, or in combination with certain other monomers.

These certain other monomers are the "lower alkyl maleates," the "lower alkyl fumarates," and the "higher aliphatic vinyl esters." The "lower alkyl maleates" are the esters and half-esters formed by the reaction of maleic acid with ethyl, propyl, butyl, isobutyl, hexyl, ethyl-hexyl, or octyl alcohol. The "lower alkyl fumarates" are the esters and half-esters of fumaric acid with these same alcohols. The "higher aliphatic vinyl esters" are vinyl valerate, vinyl caproate, vinyl heptanoate, vinyl 2-ethylhexoate, vinyl octanoate and vinyl pelargonate.

Copolymers can be successfully obtained with any combination of the lower aliphatic vinyl esters. However, we have found that if a copolymer is desired containing one or more monomers selected from the lower alkyl maleates, the lower alkyl fumarates, and the higher aliphatic vinyl esters, a certain minimum proportion of lower aliphatic vinyl esters is necessary. In the case of vinyl acetate, the minimum amount is about 30%. For vinyl propionate, the minimum is about 45%. For vinyl butyrate and vinyl isobutyrate, the minimum is about 50%. Except for this limitation, any combination of monomers selected from the four defined groups may be used.

The use of a lesser amount of lower aliphatic vinyl ester than that specified results in a system wherein the polymer particles do not form a stable latex but rather separate from the aqueous phase. It would appear from this fact that perhaps the polymerization according to our process is initiated in water solution and is propagated by the diffusion of additional monomer to the active centers in the previously initiated polymer particles. It would further appear that of the four specified groups of polymers only the lower aliphatic vinyl esters have a sufficient degree of solubility in water at the polymerization temperatures to provide for the formation of a sufficient number of active centers to form a stable latex having fine particles. If an amount of lower aliphatic vinyl esters in excess of the minimum amount specified above is used, excellent polymers and copolymers result.

II. ADDITION OF MONOMER

These observations are further confirmed by the fact that we have found it necessary to add the monomer to the aqueous system either continuously or in small stepwise additions. We have found that the presence of a substantial separate monomer layer at any stage of the polymerization process results either in the formation of coagulum or of polymer beads. To avoid the formation of coagulum or of polymer beads, we add the monomer at a rate slow enough that under mild agitation no substantial monomer phase appears. Another factor which determines the maximum rate at which the monomer can be added is the fact that the polymerization in the case of each of the monomers specified is exothermic. We prefer to add the monomer at a rate at which the desired polymerization temperature can be maintained.

III. PERSULFATE INITIATOR

The only initiators that we have found to be suitable in our process are the persulfate salts of the alkali metals and of ammonia. Thus, we select as our initiator either ammonium persulfate, sodium persulfate, potassium persulfate, or lithium persulfate. The persulfate salts of the bivalent metals and other known initiators including the organic and inorganic peroxides or the peroxide type initiators such as the perborates do not yield suitable latices.

IV. PROTECTIVE ELECTROLYTE

We have also found it necessary that the aqueous phase contain as a protective electrolyte a certain proportion of a stable, water soluble, alkali metal or ammonium salt of an organic or inorganic acid where the acid radical contains two or more oxygen atoms. The presence of such a salt appears to have a stabilizing effect on the latex and to increase the yield markedly.

As pointed out above, it is necessary that the protective electrolyte be stable under the operating conditions. Since the persulfate initiator is an oxidant, electrolytes which are easily oxidized are not suitable. Salts such as the bisulfites, the nitrites, and the phosphites, since they are in a lower oxidation level and are easily oxidized, cannot be used. So, also, organic acid salts such as the oxalates and the tartrates, which have oxidation labile sites, are unsuitable. For the same reason, electrolytes with aldehyde groups are unsuitable. Salts of the unsaturated organic acids are not suitable, for the reason that the double bond is easily oxidized and in addition the salt might polymerize. We find that easily hydrolyzed salts such a sodium ethylate should be avoided.

Even with these exclusions there are a great number of inorganic alkali metal and ammonium salts which are suitable either alone or in combination for use as the protective electrolyte. Typical inorganic salts include the carbonates, the bicarbonates, the bisulfates, the phosphates, and the borates such as sodium tetraborate, potassium tripolyphosphate, disodium phosphate, and sodium bicarbonate. Although we prefer to use salts of weak acids to obtain the advantage of the buffering action to prevent hydrolysis of the vinyl esters, salts of strong acids such as the sulfates and nitrates can be employed, especially in mixtures with salts of weak acids.

Alkali metal and ammonium salts of the lower saturated monocarboxylic and polycarboxylic acids may also be used provided that the salt is sufficiently water soluble. Suitable salts include those of acetic acid, propionic acid, butyric acid, isobutyric acid, valeric acid, and caproic acid, among the monocarboxylic acids and malonic acid, succinic acid, glutaric acid, adipic acid, pimelic acid, suberic acid, azelaic acid, and citric acid among the polycarboxylic acids. In addition, suitable substituted derivatives of the organic acids may also be used, such as the various sulfonated and chlorinated derivatives, as well as the chloroacetates, and the lower alkyl substituted monocarboxylates and dicarboxylates.

As pointed out above, to be effective as a stabilizing electroylte, the acid radical must contain at least two oxygen atoms. We believe that the effectiveness of the stabilizing electrolyte is due to hydrogen bonding with the oxygen atoms. It is possible for the electrolyte to bond with the polymer particles by means of hydrogen bonding, thus charging the polymer particles and providing a stable latex. In any event, we have found that unless the acid radical contains at least two oxygen atoms, a salt is not suitable. For example, we have found that sodium chloride, sodium sulfide, and sodium bromide are ineffective as a protective electrolyte.

V. PROPORTION OF INITIATOR AND PROTECTIVE ELECTROLYTE

Not only have we found that the persulfate initiator and the protective electrolyte are necessary individually for satisfactory results, but we have also found that the total concentration of these two ingredients and the relative concentration one to another are both somewhat critical for satisfactory results. The relation between the concentration of the persulfate initiator and the concentration of the protective electrolyte is shown in the graph of FIGURE 1.

In this figure, the concentration of persulfate initiator is expressed as moles of persulfate per 100 grams of water, and is expressed as moles$\times 10^{-3}$. The concentration of the protective electrolyte is expressed as moles of electrolyte per 100 grams of water times the number of oxygen atoms in the acid radical of that electrolyte. Thus, a single mole of electrolyte containing two oxygen atoms in the acid radical would have a relative value of two in accordance with the terms used for the abscissa of FIGURE 1, whereas a single mole of electrolyte having four oxygen atoms in the acid radical would have a relative value of four. For convenience we shall refer to this value as the oxygen weighted concentration. As in the case of the ordinate, the values used in the abscissa have also been expressed in terms of $10^{-3}$.

We have found that if the concentration of persulfate and the oxygen weighted concentration of the protective electrolyte are maintained within the area described by line ABCDEFA in FIGURE 1, a high yield of a stable latex having a small particle size and a high concentration can be obtained. The optimum results are obtained when the relative concentration of persulfate and electrolyte lies generally along line FB.

It is possible to obtain satisfactory results in the absence of any protective electrolyte if a sufficient quantity of persulfate is employed. However, the absence of a protective electrolyte may in some instances render the resulting latex unstable. For this reason, we prefer to employ a concentration of at least 0.0001 oxygen weighted mole of electrolyte per 100 grams of water, as shown by line EA of FIGURE 1.

From the general shape of the curve and especially from the slope of line FB it will be noted that the required concentration of persulfate is reduced as the oxygen weighted concentration of electrolyte is increased. However, under no conditions has a satisfactory latex resulted where the concentration of persulfate has been less than 0.001 mole per 100 grams of water or greater than about 0.0046 mole per 100 grams of water.

Where more than one electrolyte is used in a single polymerization mixture, the value entered on the abscissa of FIGURE 1 is the arithmetical sum of the oxygen weighted concentration of each of those protective electrolytes. As an example not only of this, but also of the use of the graph in FIGURE 1 in general, let us consider a reaction mix where 0.4 gram of potassium persulfate, 0.434 gram of sodium tetraborate decahydrate and 0.032 gram of sodium bicarbonate have been used in 80 grams of water (the proportions of the aqueous phase used in Example 5). Upon conversion to moles per 100 grams of water, it is found that this particular mixture contains 0.00143 mole of sodium tetraborate decahydrate and 0.000476 mole of sodium bicarbonate. Since sodium tetraborate contains seven oxygen atoms in the acid radical, the molar concentration is multiplied by seven to give an oxygen weighted concentration of 0.01. Since sodium bicarbonate contains three oxygen atoms in the acid radical, the molar concentration of this ingredient is multiplied by three to give an oxygen weighted concentration of 0.00143. In this instance, the total oxygen weighted concentration of the protective electrolytes is 0.01143. The concentration of persulfate is 0.00185 mole per 100 grams of water. The relative concentrations of the persulfate initiator and protective electrolyte in this example are shown at point P on FIGURE 1.

VI. TEMPERATURE

The final important variable in our polymerization system is the temperature at which the polymerization is conducted. We have found that there is a certain minimum temperature below which a satisfactory yield and concentration of latex cannot be obtained. This minimum temperature is a variable depending upon the particular monomer or monomer combination employed. In the case of vinyl acetate, the minimum temperature is 77° C. In the case of vinyl butyrate, the minimum temperature is 68° C.

We have further found that this minimum temperature can be expressed as a straight-line relation for the various monomers within the scope of the present invention if only the molecular weight of the side chains attached to the —CH=CH— group common to all of these monomers is considered. In other words, a straight-line relation exists between the molecular weight and the minimum polymerization temperature if the molecular weight of the monomer is reduced by 26, the molecular weight of the vinyl group. This relation is shown in FIGURE 2.

In FIGURE 2, the ordinate is the minimum polymerization temperature expressed in degrees centigrade, and the abscissa is a weighted function of the molecular weight of the side groups of the monomer or monomer combinations. For convenience, this latter value is referred to as N.

Point V represents vinyl acetate where the minimum polymerization temperature is 77° C. and the molecular weight is approximately 86, resulting in an N value of 60. Point U represents vinyl butyrate which has a minimum polymerization temperature of 68° C. and a molecular weight of approximately 114 or an N value of 88. The minimum polymerization temperatures of any monomer or monomer combination within the scope of this invention can be ascertained by determining the N value of that monomer or monomer combination and then determining the temperature corresponding to that N value on line VU of FIGURE 2. For example, it has been determined experimentally that the minimum polymerization temperature for vinyl propionate monopolymer is approximately 72½° C. The molecular weight of vinyl propionate is 100, and the N value is 100—26, or 74. Since satisfactory reaction conditions cannot be maintained if the temperature is less than 68° C., regardless of the N value of a particular monomer combination, this minimum temperature of 68° C. applies to those monomer combinations where the N value is in excess of 88.

It has been found upon trying to fit the minimum polymerization temperature of monomer mixtures to the relation shown in FIGURE 2 that the N value is not a direct function of the molecular weight of the monomer but rather is a weighted function. The minimum polymerization temperature of a mixture of monomers can be determined from the graph of FIGURE 2 if N is defined as:

$$N = \frac{A+B+C}{\frac{A}{X}+\frac{B}{Y}+\frac{C}{Z}}$$

where

A is the number of moles of monomer A
B is the number of moles of monomer B
C is the number of moles of monomer C
X is the molecular weight of the side chains of monomer A (molecular weight of the monomer —26)
Y is the molecular weight of the side chains of monomer B
Z is the molecular weight of the side chains of monomer C.

This definition of N is derived from the relation:

$$\frac{A}{X}+\frac{B}{Y}+\frac{C}{Z} = \frac{A+B+C}{N}$$

It will be noted that if only one monomer is present, N equals the molecular weight of the side chains of that monomer, e.g., $$N = \frac{A}{\frac{A}{X}} = X$$

where X is the molecular weight of the monomer minus 26. Thus in the case of vinyl acetate, $N = 86-26 = 60$.

The validity of the relation has been determined experimentally for a number of comonomer systems. For example, it has been determined that the minimum polymerization temperature for a monomer mixture consisting of 77 parts by weight of vinyl acetate and 23 parts by weight of di-butyl maleate is about 76° C. The molecular weight of vinyl acetate is 86 and the molecular weight of di-butyl maleate is 228. The number of moles of di-butyl maleate is $$\frac{23}{228}$$

and the number of moles of vinyl acetate is $$\frac{77}{86}$$

Applying these values to the relation for N which now is $$N = \frac{A+B}{\frac{A}{X}+\frac{B}{Y}}$$

since only two monomers are present:

$$A = \frac{77}{86};\ B = \frac{23}{228}$$

$X=60$; $Y=202$; and $N=64.6$. The minimum temperature corresponding to an N value of 64.6 as derived from line UV of FIGURE 2 is 75½° C. as compared to the experimental value of 76° C.

Thus, for any combination of monomers within the scope of this invention, the minimum polymerization temperature may be ascertained by determining the value of N and then reading the corresponding temperature from line UV of FIGURE 2. Line UV may also be expressed as the relation $T = 96.2 - 0.32N$ where T is the minimum polymerization temperature and N is the value determined as above.

Since the temperature determined as above is the minimum temperature at which successful results can be obtained, and since there may be some variation in the ultimate stability of the system with various combinations of persulfate initiator and protective electrolyte, we prefer to operate our polymerization at a temperature somewhat in excess of the minimum temperature. To provide a sufficient factor of safety, we normally conduct our polymerization reaction at a temperature at least 2° or 3° C. higher than the minimum indicated and normally obtain our best results if the polymerization temperature is 5° to 10° C. higher than the temperature indicated.

On the other hand, there is a very definite maximum temperature at which our polymerization system is operable. This maximum is determined by the temperature at which the persulfate initiator decomposes at such a rapid rate that the reaction cannot be sustained over the entire period during which the monomer is added. Under our reaction conditions the rate of decomposition of the persulfate initiator becomes excessive in the range between 90° C. and 95° C. We, therefore, prefer to maintain the polymerization temperature at a level above the minimum temperature determined as above and below a temperature of 90° to 95° C.

The application of the several requirements outlined above can best be appreciated by considering typical polymerization reactions conducted according to our invention. Each of the following examples results in a high yield of a stable latex having dispersed polymer particles of a fine particle size. For convenience, the quantities of ingredients set forth in each of the following examples have been scaled to a range suitable for a laboratory reaction.

The equipment that may be used to repeat these examples consists of a standard three-necked, round, one liter glass flask fitted with an Alihn condenser, a variable speed stirrer, and a thermometer. A suitable agitator consists of a thin flat blade with a rounded bottom edge made of stainless steel and affixed to the stirrer rod. Heat is supplied by an external water bath fitted with a thermostatically controlled electric heater. The monomer is added from a dropping funnel placed in the upper end of the condenser tube.

In each case, the specified quantity of water is placed in the reaction flask and is heated by means of external water bath to the desired polymerization temperature. After this temperature is reached, the specified quantity of persulfate initiator and protective electrolyte is added to the water and the addition of monomer is begun. In each polymerization, the temperature is maintained as close as possible to the lower temperature value given in the example until near the end of the monomer addition, when the temperature is permitted to rise to the higher value. In many instances, after all the monomer has been added, the temperature is allowed to peak to a higher temperature level to complete the reaction. Any necessary additional heat may be supplied by the external water bath. Upon completion of the reaction, the reaction mixture is cooled to room temperature. Mild agitation of the reaction mixture is continued throughout the entire polymerization reaction.

In each case, the reaction was conducted until less than 1% of free monomer remained in the reaction mixture. The amount of free monomer remaining was determined by the ordinary analytical procedures such as titration.

While a convenient charge for this apparatus is based on 250 grams of monomer, all of the following examples have been expressed in terms of a monomer charge of 100 grams to permit easy conversion to other quantities.

*Example 1*

0.35 gram of potassium persulfate and 0.55 gram of potassium citrate monohydrate were added to 80 grams of water heated to a temperature of 82° C. To this mixture was added 100 grams of vinyl acetate in a dropwise manner. The addition of monomer required a period of 3 hours and 20 minutes so that the average rate of addition was 0.436 mole of vinyl acetate per 100 grams of water per hour. During monomer addition, the temperature was maintained at 82–85° C. and, after all the monomer had been added, the temperature was allowed to peak at 90° C. during an additional period of 20 minutes. A 91.6% yield of a 53% total solids polyvinyl acetate latex resulted.

The size of the particle in this latex was determined by means of an electron microscope and was found to be 0.3±0.1 micron. The polymer particles appeared as well dispersed, substantially perfect spheres with a remarkable uniformity of size. The particle size that would be expected, had an emulsifying agent been used under corresponding conditions, would be in the range of 0.5 to 2 microns with an average particle size of about one micron. The polymer particles in the latices resulting from the other examples were examined by optical means and found to be approximately in the same size range as the particles of the latex of this example.

*Example 2*

0.625 gram of potassium persulfate and 0.45 gram of disodium phosphate tetrahydrate were added to 80 grams of water heated to a temperature of 82° C. 100 grams of vinyl propionate were introduced at the rate of 0.652 mole per hour per 100 grams of water. The time for the addition of the monomer was 1 hour 55 minutes. During this time, the temperature was maintained between 82° C. and 85° C. After all of the monomer was added, the temperature of the reaction mixture was permitted to rise to 95° C. over a period of one half hour. A 95% yield of a stable latex with a total solids content of 58.4% resulted.

*Example 3*

To a reaction mixture containing 0.4 gram of potassium persulfate, 0.42 gram of potassium citrate monohydrate and 80 grams of water, 100 grams of vinyl butyrate were added over a period of one and one half hours. During this time, the temperature was maintained between 70° C. and 75° C. After all of the monomer was added, the reaction mixture was maintained at a temperature of 77° C. for an additional period of one hour. An 88.8% yield of a stable latex having a total solids content of 52% resulted.

*Example 4*

100 grams of vinyl acetate was added to 71.2 grams of water containing 0.444 gram of potassium persulfate, 0.178 gram of sodium acetate trihydrate and 0.89 gram of sodium bicarbonate. The monomer was added over a period of 5 hours 45 minutes during which time the temperature was maintained at 79.5 to 85° C. After the addition of the monomer was completed, the reaction was continued for 15 more minutes and allowed to reach a maximum temperature of 89° C. A 94.1% yield of a stable latex with a total solids of 59.6% resulted.

*Example 5*

A mixture of 23 grams dibutyl maleate and 77 grams vinyl acetate was added to 80 grams of water, containing 0.4 gram of potassium persulfate, 0.434 gram of sodium tetraborate decahydrate, and 0.032 gram of sodium bicarbonate. The addition time was 4 hours and the temperature was maintained at 81 to 86° C. The reaction was continued for 40 minutes more during which the maximum temperature was 91° C. The addition rate was 0.31 mole of monomer per hour per 100 parts of water. A 91.0% yield of a stable latex having a total solids content of 54.0% resulted.

*Example 6*

35 grams of vinyl acetate and 65 grams of vinyl pelargonate were added to 86 grams of water containing 0.44 gram of sodium persulfate and 0.5 gram of sodium succinate hexahydrate. Time of addition was 5 hours 55 minutes. The reaction was continued for 1 hour and 20 minutes longer. Reaction temperature during the time of addition was maintained between 75–85° C. The yield was 89.6%. The total solids were 53.4%.

Example 7

77 grams of vinyl propionate and 23 grams of dibutyl fumarate were added to 80 grams of water containing 0.62 gram of sodium persulfate and 0.17 gram of disodium hydrogen phosphate heptahydrate. The time of addition was 3 hours 30 minutes. Reaction was continued for an additional 10 minutes. The temperature was maintained between 80-85° C. during both periods. The yield was 93.4%. The total solids were 55.0%.

Example 8

35 grams of vinyl acetate and 65 grams of dibutyl fumarate were added to 86 grams of water containing 0.5 gram of potassium persulfate and 0.3 gram of trisodiumsulfosuccinate. The addition time was 5 hours 30 minutes. The reaction was continued for an additional hour. The temperature was maintained at 82° C. The yield was 91.6%. The total solids were 51.3%.

Example 9

70 grams of vinyl butyrate and 30 grams of diethyl maleate were added to 86 grams of water containing 0.42 gram of ammonium persulfate and 0.265 gram of ammonium citrate. Addition time was 2 hours 10 minutes. The reaction was continued for an additional 15 minutes. The reaction temperature was maintained between 79 and 86° C. The yield was 90.3%. The total solids were 51.0%.

Example 10

77 grams of vinyl acetate and 23 grams of dibutyl maleate were added to 66.6 grams of water containing 0.58 gram of potassium persulfate and 0.26 gram of potassium tripolyphosphate. Time of addition was 6 hours 30 minutes. The reaction was continued for an additional hour. Temperature was maintained between 79 and 90° C. The yield was 92.7%. The total solids were 58.6%.

Example 11

62.5 grams of vinyl acetate and 37.5 grams dibutyl maleate were added to 80 grams of water containing 0.44 gram of sodium persulfate and 0.55 gram of potassium propionate. Addition time was 4 hours 20 minutes. The reaction was continued for an additional 40 minutes. Temperature was maintained between 76 and 82° C. The yield was 94.8%. The total solids were 54.6%.

Example 12

35 grams of vinyl acetate and 65 grams of vinyl 2-ethyl-hexoate were added to 80 grams of water containing 0.5 gram potassium persulfate and 0.35 gram of potassium citrate monohydrate. Addition time was 6 hours and 30 minutes. The reaction was continued for an additional hour and 30 minutes. The temperature was maintained between 76 and 85° C. The yield was 95%. The total solids were 54.3%.

Example 13

33 grams of vinyl acetate and 67 grams of vinyl butyrate were added to 80 grams of water containing 0.4 gram of potassium persulfate and 0.42 gram of potassium citrate monohydrate. Time of addition was 4 hours and 20 minutes. The reaction was continued for an additional 10 minutes. Temperatures were maintained between 69 and 78° C. The yield was 90.6%. The total solids were 52.0%.

Example 14

60 grams of vinyl acetate and 40 grams of dibutyl maleate were added to 80 grams of water containing 0.6 part of potassium persulfate and 0.16 part sodium bicarbonate. Addition time was 4 hours and 5 minutes. Reaction was continued for an additional 25 minutes. Temperature was maintained between 80 and 87° C. The yield was 93.2%. The total solids were 53.7%.

Example 15

A mixture of 40 grams of vinyl acetate, 30 grams of dibutyl fumarate, and 30 grams of vinyl 2-ethyl-hexoate was added to 80 grams of water containing 0.7 gram of potassium persulfate and 0.103 gram of sodium bicarbonate. During the addition time of 6 hours and 10 minutes the temperature was kept at 80-85° C. Heating was continued for an additional one and one half hours during which the temperature was allowed to peak at 87° C. The yield was 93.9%. The total solids were 54.3%.

We claim:

1. The process of producing a stable, high solids vinyl ester polymer latex containing dispersed polymer particles having a fine particle size which includes the steps of preparing an aqueous solution the ingredients of which are ineffective as emulsifiers in the process and which consists essentially of an initiator selected from the group consisting of the alkali metal persulfates and ammonium persulfate, and a protective electrolyte selected from the group consisting of the water-soluble alkali metal and ammonium salts of acids selected from the group consisting of the inorganic acids, the saturated monocarboxylic acids containing not more than six carbon atoms per molecule and the saturated polycarboxylic acids containing not more than nine carbon atoms per molecule, said protective electrolyte being resistant to oxidation by the persulfate initiator under the reaction conditions of the process and being further characterized by the formation in water solution of anions containing at least two oxygen atoms; the concentration of said persulfate salt and the concentration of said protective electrolyte both being such that when plotted as in FIGURE 1, they lie within the area defined by line ACEA; adding thereto in a continuous manner a monomer selected from the group consisting of (1) 100% of a monomeric vinyl ester selected from the group (a) of lower aliphatic vinyl esters consisting of vinyl acetate, vinyl propionate, vinyl butyrate and vinyl isobutyrate; (2) mixtures of at least two of the said lower aliphatic vinyl esters (a); (3) mixtures of at least 30% of vinyl acetate with at least one additional monomeric substance selected from the group consisting of (b) the alkyl esters of maleic acid, the alkyl radicals of which contain from two to eight carbon atoms, (c) the alkyl esters of fumaric acid, the alkyl radicals of which contain two to eight carbon atoms, and a monomeric vinyl ester selected from the group (d) of higher aliphatic vinyl esters consisting of vinyl valerate, vinyl caproate, vinyl heptanoate, vinyl 2-ethyl-hexoate, vinyl octanoate and vinyl pelargonate; (4) mixtures of at least 45% by weight of vinyl propionate with at least one additional monomeric substance selected from groups (b), (c), and (d) above; (5) mixtures of at least 50% by weight of vinylbutyrate with at least one additional monomeric substance selected from groups (b), (c), and (d) above; and (6) mixtures of at least 50% by weight of vinyl isobutyrate with at least one additional monomeric substance selected from groups (b), (c) and (d) above; and maintaining the reaction mixture during the addition of the monomer at a temperature not less than the minimum value indicated in FIGURE 2 and not greater than 90° C.

2. The process according to claim 1 wherein the monomer is vinyl acetate.

3. The process according to claim 1 wherein the monomer is a mixture of vinyl acetate and vinyl butyrate.

4. The process according to claim 1 wherein the monomer is a mixture which contains at least 30% vinyl acetate, the remainder being dibutyl maleate.

5. The process according to claim 1 wherein the monomer is a mixture which contains at least 30% vinyl acetate, the remainder being vinyl 2-ethyl-hexoate.

6. The vinyl ester polymer latex made according to the process of claim 1.

References Cited in the file of this patent

UNITED STATES PATENTS

| | | |
|---|---|---|
| 2,118,864 | Reppe et al. | May 31, 1938 |
| 2,296,403 | Renfrew et al. | Sept. 22, 1942 |
| 2,375,140 | Semon | May 1, 1945 |
| 2,444,396 | Collins et al. | June 29, 1948 |
| 2,559,749 | Benning | July 10, 1951 |
| 2,706,192 | Hoag | Apr. 12, 1955 |
| 2,833,737 | Mark et al. | May 6, 1958 |
| 2,847,404 | Hoertz | Aug. 12, 1958 |

OTHER REFERENCES

Willis: "Industrial and Engineering Chem.," volume 41, Number 10, pages 2272–2276.

Whitby et al.: "Journal of Polymer Science," volume XVI, pages 549–576 (1955).